Oct. 19, 1943.  A. ZEITLIN  2,332,288
COMPENSATING POTENTIOMETER
Filed April 9, 1942  2 Sheets-Sheet 1
FIG.1.
FIG.2.
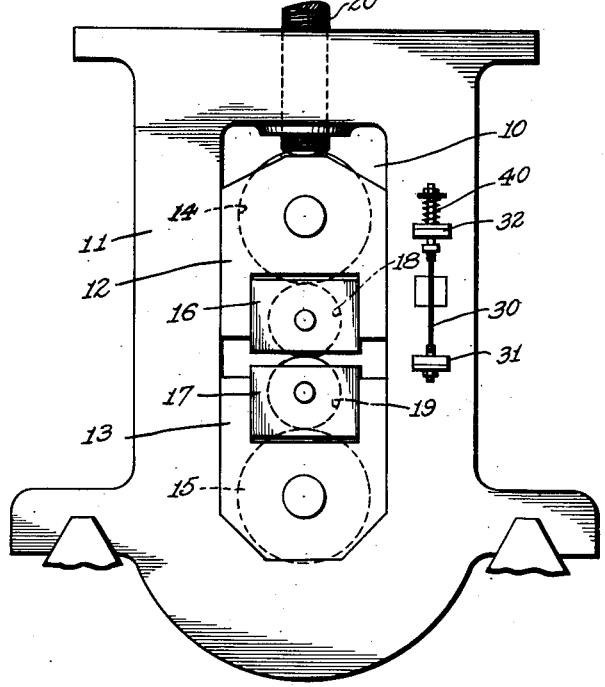
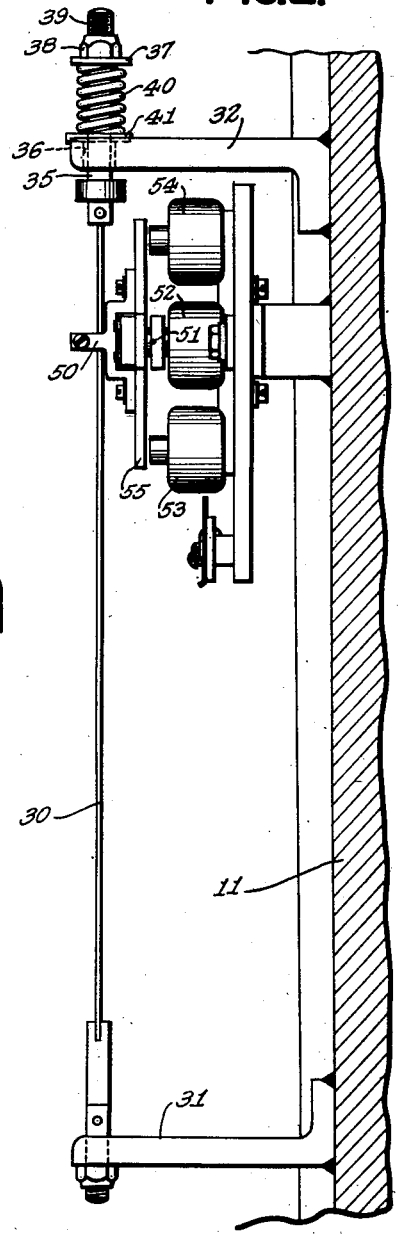
INVENTOR
ALEXANDER ZEITLIN
BY
*Joseph H. Lipschutz*
ATTORNEY Oct. 19, 1943.　　　A. ZEITLIN　　　2,332,288
COMPENSATING POTENTIOMETER
Filed April 9, 1942　　　2 Sheets-Sheet 2

INVENTOR
ALEXANDER ZEITLIN
BY Joseph H. Lipschutz
ATTORNEY

Patented Oct. 19, 1943

2,332,288

UNITED STATES PATENT OFFICE 2,332,288

COMPENSATING POTENTIOMETER

Alexander Zeitlin, New York, N. Y., assignor, by mesne assignments, to Sperry Products, Inc., a corporation of New York Application April 9, 1942, Serial No. 438,281

4 Claims. (Cl. 265—1)

This invention relates to devices such as potentiometers for controlling the delivery of a variable amount of electrical energy. More particularly, it relates to this type of device wherein the amount of electric energy to be delivered is to be compensated for some variable factor, such as variable temperature and the like, necessitating the delivery of more or less electric energy. Thus in a device such as a pressure indicator for steel rolling mills where the pressure between the rolls is caused to generate an electric current, a potentiometer is utilized for the purpose of balancing this current and at the same time indicating the degree of pressure between the rolls, which is a function of the electric current generated. In such device the varying temperature of the mill and of the surrounding atmosphere causes variations in pressure between the rolls and in order to compensate for this variable factor which also generates electrical energy, means are provided for generating a balancing potential which is a function of the variable factor, namely, temperature. In these devices the electrical current generated by the pressure between the rolls is adapted to be balanced by a potentiometer which taps a source of electric energy and which is adapted to be actuated to tap increasing amounts of electric energy until the electric energy generated by the pressure between the rolls is balanced. In order to compensate for the effect of temperature there has heretofore been employed a second potentiometer which was adapted to be rendered effective when no material was passing between the rolls, in order to generate a compensating quantity of electric energy sufficient to offset the presence of any electric output caused by pressure between the rolls not due to material passing therethrough, but to temperature. It will be seen that this compensating mechanism involved the use of two potentiometers, a condition which is not desirable if it can be avoided because of the complication and because of the fact that potentiometers tend to introduce variables due to deposits of foreign material, etc. so that where more than one potentiometer is employed such errors are likely to be multiplied.

It is the principal object of this invention, therefore, to provide a means for supplying a variable amount of electric energy such as a potentiometer, which contains within itself means for compensating for the effects of some other variable, as for instance, temperature, without the necessity of employing one or more additional potentiometers for the purpose of generating opposing potentials to compensate for those potentials generated by the variable factors.

While I have described my invention in the accompanying drawings and specification as applied to the case of a pressure gauge for measuring the pressure between the working rolls of a rolling mill stand, it will be understood that the invention has general application to any case wherein a variable amount of electric energy is to be tapped by an instrument, and compensating means employed for increasing or decreasing the amount of energy so tapped.

In the accompanying drawings,

Fig. 1 is a side elevation of one of the two bearing frames of a rolling mill.

Fig. 2 is a front elevation of the sensitive element applied to the Fig. 1 frame.

Figure 3:
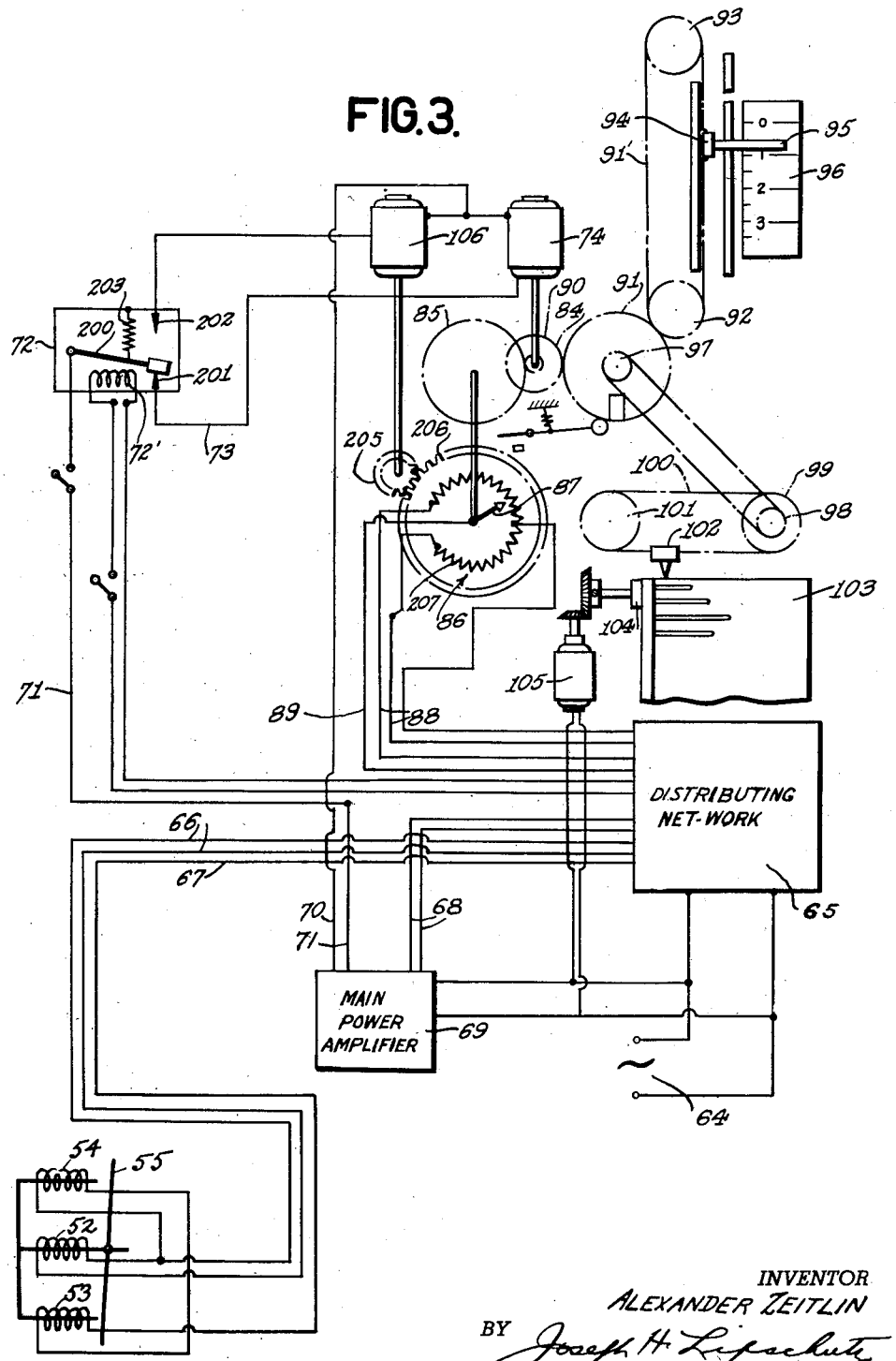
Fig. 3 is a wiring diagram with mechanical parts indicated diagrammatically, illustrating the theory of this invention.

As stated hereinbefore, the invention is shown as part of a pressure gauge applied to measuring the pressure between the working rolls of a continuous rolling mill stand. A continuous rolling mill assembly usually comprises ten mill stands, the first four of which are spaced a considerable distance apart and the succeeding mills being spaced closer together. A slab of metal is discharged from the furnace on to a conveyor and is passed successively through the rolling mill stands, being reduced in thickness and lengthened as it thins out, until the material which was discharged from the furnace as a relatively small thick slab comes out of No. 10 mill stand as a thin sheet of perhaps a thousand feet in length and travelling at speeds of a thousand to fifteen hundred feet per minute. Each stand in succession applies large pressure to the material passing through it, on the order of several million pounds, and naturally all of the parts of the mill stand including the bearings and the mill frame, are subjected to great strain. The necessity for measuring the pressures during the passage of the material through the rolls is therefore apparent, not only for the protection of the mill stand and the rolls, but also in order that the thickness of the material may be controlled, since the thickness is a direct function of the pressure applied to the rolls.

Each mill stand comprises two spaced side frames 11. Each side of a four-high rolling mill stand has a central cutout portion 10 within which are located bearing blocks 12 and 13 in which the heavy back-up rolls 14 and 15 are journaled. Within the blocks 12 and 13 are smaller blocks 16 and 17 containing the bearings for the working rolls 18 and 19. These working rolls are driven in opposite directions by powerful motors, not shown, and the material to be rolled passes between them. The back-up rolls 14 and 15 have for their purpose the prevention of undue deflection or breakage of the working rolls and are accordingly made much heavier. A large screw 20 bears down on the top of the block 12 to exert pressure against the bearings of the back-up rolls, which in turn force the work rolls together. The screw 20 is therefore a means by which varying pressures may be applied to the material while it is being rolled. This pressure causes the material to decrease in thickness, and as it passes successively through the rolling mill stands it will finally become the thin, long ribbon mentioned hereinbefore, the thickness of which is determined directly by the pressure applied while it passes through the mills.

In order to measure the pressure existing between the work rolls, advantage is taken of the fact that such pressure causes tensile stresses in the vertical portion of the rolling mill stand. Therefore there is provided a sensitive element which may take the form of a wire filament 30 connected at its ends to supports 31 and 32 which are welded to the upright portion of the frame 11 in such position that the element 30 is positioned in the neutral axis with respect to bending so that said element will respond to tensile stresses only and not to bending stresses. The filament 30 is connected to support 31 fixedly and is connected to support 32 yieldably through a resilient connection. The resilient connection may be effected by causing one end of element 30 to be fixed to a member 35 slideable in an opening 36 in support 32 and carrying at its outer end a flange 37 locked in position by a nut 38 on the screw threaded end 39 of member 35. A spring 40 is interposed between flange 37 and a flange 41 fixed to the support 32 so as normally tending to maintain the wire 30 in its taut or fully stretched position. When tensile stress occurs in the upright portion of frame 11 it will tend to stretch the frame and carry the wire 30 bodily with the support 31 so that the distance between members 31 and 32 increases and member 35 will slide within opening 36 against the action of spring 40. Such movement is, of course, directly proportional to the tensile stress in the frame which is in turn directly proportional to the load applied to the rolls within the frame.

In order that the movement of wire 30 shall operate a suitable indicator, there is fixed to said wire by means of an arm 50 an armature 55 pivoted at 51 on a torsion wire pivot and symmetrically positioned with respect to three coils, the center coil 52 being the primary and the outer coils 53 and 54 being the secondary coils of a transformer. Normally the air gaps between the cores of coils 52, 53 and 54 and the armature 55 are constant, but upon movement of wire 30 in response to stretching of the frame the armature will be rotated around pivot 51 to decrease the gap between the armature and the core of the coil 53, and, of course, increase the gap between said armature and the core of coil 54. This produces an electric current which is caused to operate an indicator in a manner about to be described.

The change of air gap caused by the movement of the armature 55 from its central position to a tilted position is caused to generate an A. C. potential, hereinafter called the gauge signal, which now may be amplified in a suitable amplifier of known design, the output of which may be utilized either to position the pointer of an electrical measuring instrument or to drive a suitable motor in such direction as to move a pointer or recorder pen over a scale. The instrument illustrated herein uses the last mentioned scheme. The center coil receives its energy from the A. C. supply line 64 which passes through a distributing net-work in the box 65 and flows from there through lines 66 to the differential gauge. The output potential from the two secondary coils 53, 54 is returned to the same box 65 through lines 66 and 67. In box 65 the gauge signal is amplified in a one stage amplifier and from there it enters through lines 68 into the main power amplifier 69 of conventional design. The output of this amplifier through lines 70 and 71 is connected to a relay switch 72 from where it enters through lines 73 into the dial drive motor 74.

The function of said motor 74 is dual in that it drives a dial for indicating pressures and at the same time drives a follow-up mechanism to generate an electric potential equal and opposite to the electric potential generated by the gauge. When the motor is operated sufficiently to cause said two signals to be equal, it stops and the dial which it has driven also stops and this gives an indication of the magnitude of the pressure.

The output signal from amplifier 69 having energized relay 72, current enters the motor 74 which then drives gears 84 and 85. The latter gear is connected to the arm 87 of a potentiometer 86. A constant voltage in phase with the gauge signal and hereafter called the balancing voltage is supplied to the two ends of the potentiometer through lines 88 from the A. C. supply so that the slider 87 will move along points of varying potential as it slides over the potentiometer wire. This varying potential through line 89 is fed back to the box 65 and is there mixed with the gauge signal entering the box through lines 66 and 67 in such a way that it opposes the gauge signal. It is obvious therefore that while the motor is rotating it will cause an increasing potential to oppose the gauge output potential until both potentials are equal, at which time the input to the amplifier 69 becomes zero, causing the motor 74 to stop. The voltage obtained from the potentiometer and the total revolutions of motor 74 now must be proportional to the amplitude of the gauge signal.

For causing an indicator to be actuated proportionally to the revolutions of the motor 74 there are provided gears 90 and 91 driven from motor 74, the latter gear being connected to a chain 91' operating over pulleys 92 and 93 so that said chain will move in synchronism with the motor. Connected to said chain 91' is a carriage 94 to which is fixed a pointer 95 sliding over a scale 96 which may be graduated in any suitable way to indicate pressures. Preferably this scale is graduated in millions of pounds. When the motor 74 stops because the signal generated by potentiometer 86 is equal and opposite to the gauge signal, the pointer 95 has reached a position at which it accurately indicates the pressure exerted by the reaction of the material passing through the rolls.

If a record of the pressures is desired, there may be mounted on the same shaft with gear 81 a chain pulley 97 driving another chain pulley 98. On the same shaft with the pulley 98 is fixed another pulley 99 of the same type, which by means of a chain 100 is connected to pulley 101. To the chain 100 is fixed recording pen 102 sliding over a strip of paper 103 which is rotated by a roller 104 driven from a constant speed motor 105. The motions of the pen 102 are proportional to the motions of the pointer 95 so that if the paper strip 103 is moved at constant speed the pen 102 will permanently record the motions of the pointer 95 and thereby the pressures exerted by the reaction of the material passing between the rolls.

The instrument as described would perform satisfactorily only if all working parts of the mill and in the instrument would be insensitive to temperature changes. Obviously, the effect of temperature would be to increase or decrease pressure between the work rolls and thus vary the output signal from the differential gauge to cause an incorrect setting of the pointer 95 by reason of the fact that motor 74 must generate a balancing potential greater or less than the true potential proportional to only that pressure due to the passage of material through the work rolls. It is necessary to provide a compensation for changes due to temperature, and therefore there is provided a temperature compensation motor 106. The motors 74 and 106 are selectively energized from relay 72 by an armature 200 engaging lower contact 201 or upper contact 202. A spring 203 normally tends to keep armature 200 in engagement with contact 202 so that the temperature compensator motor is normally effective. When, however, material passes between the rolls there is a sudden increase in signal from the differential gauge and this is caused to trip a vacuum tube having a predetermined threshold value (said tube being contained in box 65 and not shown because it is a conventional type), so that the output of said tube will energize coil 72' to attract armature 200 against the action of spring 203 and thus energize the dial drive motor 74. It will thus be seen that while material is passing between the rolls and the threshold value of the tripping tube is exceeded, the dial drive motor 74 will operate. As soon as the material has passed out of the rolls, the differential gauge will, if there is no temperature error present, return to its zero position with no output. If the temperature has introduced an error, then the gauge will have a relatively small output below the threshold value of the tripping tube and therefore coil 72' will not be energized but armature 200 will engage contact 202 to render the temperature compensator motor 106 effective.

Heretofore it has been proposed to cause the temperature compensator motor 106 to operate a potentiometer similar to potentiometer 86 operated by the dial drive motor 74, which would generate a balancing impulse sufficient to balance out the signal from the gauge in the intervals when the dial drive motor was not operating. This, however, necessitated the employment of a second potentiometer, which is undesirable for the reasons hereinbefore noted. Therefore it is proposed by this invention to cause said compensation to be effected by the use of the single potentiometer. For this purpose, instead of having only one part of the potentiometer 86 fixed and the other part movable, I cause both parts to be movably mounted. One part, such as contact arm 87, may be driven from one of said motors, e. g., the dial drive motor 74, while the other part, constituting the resistance element, may be movably mounted for rotation about the same center as arm 87 but adapted to be driven from the other of said motors, e. g., temperature compensator motor 106. This may be effected by causing the motor 106 to drive a pinion 205 which meshes with an annular gear 206 on a base upon which the resistance element 207 of potentiometer 86 is mounted.

The effect of the above construction is similar to that which would be introduced by an entire, separate potentiometer and results in giving a new zero position to the contact arm 87 which tends to nullify the temperature effect. Thus, if temperature has increased the tension in the frame to a certain initial value of, say, 100,000 pounds, and the work passing between the rolls gives an additional 1,000,000 pounds, the contact arm 87 would be operated to a degree such that 1,100,000 pounds would be indicated by pointer 85 on scale 96. In other words, this is the degree of movement of the contact arm to compensate not merely for the current generated by the gauge in response to the load, but also for the current generated by the temperature variation. With the present arrangement, however, the temperature compensator motor would operate the resistance portion 207 of the potentiometer 86 to a degree corresponding to a movement of pointer 95 of 100,000 pounds on scale 96 and in a direction such that the temperature component would be wiped out and only the increment due to load would be indicated by pointer 95 and by the movement of contact 87.

It will readily be observed that this principle of having a two-part device for taking off electric potential, both parts of which are independently movable, may be employed in various other connections and not only for temperature compensation but for correction of various other factors. Thus, while the movement of the contact arm over the potentiometer coil may respond to a given factor, a greater or lesser response, as the case may warrant, may be obtained by moving the coil relative to the contactor arm.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a pressure indicator for rolling mill stands have means responsive to deformation of the frame due to passage of material between the rolls and to deformation due to temperature variations, a compensating potentiometer comprising a resistance element and a contactor arm cooperating therewith, means whereby said contactor arm is moved in response to deformation of the frame due to passage of material between the rolls, and means whereby said resistance element is moved in response to deformation due to temperature variations.

2. In a pressure indicator for rolling mill stands have means responsive to deformation of the frame due to passage of material between the rolls and to deformation due to temperature variations, a two-part device for obtaining variable voltage, means whereby one of said parts is moved in response to deformation of the frame due to passage of material between the rolls, and means whereby said second part is moved in response to deformation due to temperature variations.

3. In a pressure indicator for rolling mill stands, having means responsive to deformation of the frame due to passage of material between the rolls and to deformation due to temperature variations, means whereby said responsive means generated electric potentials, means for generating potentials to balance said first potentials, said last-named means comprising a two-part device for obtaining variable voltage, means whereby one of said parts is moved in response to deformation of the frame due to passage of material between the rolls, and means whereby said second part is moved in response to deformation due to temperature variations.

4. In a pressure indicator for rolling mill stands having means responsive to deformation of the frame due to passage of material between the rolls and to deformation due to temperature variations, means whereby said responsive means generates electric potentials, means for generating potentials to balance said first potentials, said last-named means comprising a compensating potentiometer having a resistance element and a contactor arm cooperating therewith, means whereby said contactor arm is moved in response to deformation of the frame due to passage of material between the rolls, and means whereby said resistance element is moved in response to deformation due to temperature variations.

ALEXANDER ZEITLIN.